United States Patent
Paulus et al.

(10) Patent No.: US 10,315,188 B2
(45) Date of Patent: Jun. 11, 2019

(54) CATALYST MOLDED BODY CONTAINING GRAPHITE

(71) Applicants: Martin Paulus, Rosenheim (DE);
Frank Grossmann, Munich (DE);
Karl-Heinz Stadler, Augsburg (DE)

(72) Inventors: Martin Paulus, Rosenheim (DE);
Frank Grossmann, Munich (DE);
Karl-Heinz Stadler, Augsburg (DE)

(73) Assignee: CLARIANT INTERNATIONAL LTD., Muttenz (CH)

( * ) Notice: Subject to any disclaimer, the term of this patent is extended or adjusted under 35 U.S.C. 154(b) by 613 days.

(21) Appl. No.: 14/431,054

(22) PCT Filed: Jun. 18, 2013

(86) PCT No.: PCT/EP2013/062657
§ 371 (c)(1),
(2) Date: Mar. 25, 2015

(87) PCT Pub. No.: WO2013/189948
PCT Pub. Date: Dec. 27, 2013

(65) Prior Publication Data
US 2015/0238938 A1 Aug. 27, 2015

(30) Foreign Application Priority Data

Jun. 22, 2012 (DE) .................. 10 2012 012 510

(51) Int. Cl.
*B01J 23/889* (2006.01)
*B01J 37/08* (2006.01)
(Continued)

(52) U.S. Cl.
CPC .......... *B01J 23/8892* (2013.01); *B01J 21/18* (2013.01); *B01J 23/72* (2013.01); *B01J 35/0033* (2013.01); *B01J 35/023* (2013.01); *B01J 35/1019* (2013.01); *B01J 35/1023* (2013.01); *B01J 37/0009* (2013.01); *B01J 37/0063* (2013.01); *B01J 37/04* (2013.01); *B01J 37/08* (2013.01); *B01J 37/16* (2013.01); *B01J 37/18* (2013.01); *C10G 2/33* (2013.01); *B01J 23/02* (2013.01);
(Continued)

(58) Field of Classification Search
None
See application file for complete search history.

(56) References Cited

FOREIGN PATENT DOCUMENTS

DE     102007005606 A1 *  4/2008   ............ B01J 23/002

OTHER PUBLICATIONS

Translation of Altwasser et al. (DE Pub No. 102007005606 Google Translation) Apr. 12, 2018.*

* cited by examiner

*Primary Examiner* — Guinever S Gregorio (57) ABSTRACT

The invention relates to a catalyst molded body, which is produced by deforming a mixture of a metal oxide and a special graphite. The invention further relates to a method for producing the corresponding catalyst molded bodies and to the use of the catalyst molded bodies for catalytic reactions in which hydrogen acts as a reaction reactant or reaction product, in particular hydrogenation, hydrogenolysis, and dehydrogenation reactions. The catalysts are characterized by an improvement in the activity and selectivity in particular in hydrogenation, hydrogenolysis, and dehydrogenation reactions, said improvement being achieved by adding special graphites.

6 Claims, 3 Drawing Sheets

(51) Int. Cl.
  *B01J 21/18* (2006.01)
  *B01J 23/72* (2006.01)
  *B01J 37/00* (2006.01)
  *B01J 37/16* (2006.01)
  *B01J 37/18* (2006.01)
  *B01J 35/00* (2006.01)
  *B01J 35/10* (2006.01)
  *C10G 2/00* (2006.01)
  *B01J 35/02* (2006.01)
  *B01J 37/04* (2006.01)
  *B01J 23/34* (2006.01)
  *B01J 37/03* (2006.01)
  *B01J 23/02* (2006.01)
  *B01J 23/06* (2006.01)
  *B01J 23/28* (2006.01)
  *B01J 23/74* (2006.01)
  *B01J 33/00* (2006.01)

(52) U.S. Cl.
  CPC ............... *B01J 23/06* (2013.01); *B01J 23/28* (2013.01); *B01J 23/34* (2013.01); *B01J 23/74* (2013.01); *B01J 33/00* (2013.01); *B01J 35/002* (2013.01); *B01J 35/1014* (2013.01); *B01J 37/03* (2013.01)

CATALYST MOLDED BODY CONTAINING GRAPHITE

The invention relates to a shaped catalyst body which contains graphite as activity and selectivity promoter. The invention further relates to a process for producing corresponding graphite-containing shaped catalyst bodies and the use of this shaped catalyst body in catalytic reactions, in particular in hydrogenation, hydrogenolysis and dehydrogenation reactions.

BACKGROUND OF THE INVENTION

Graphite is a modification of the element carbon, with six hexagonally arranged carbon atoms forming the basic unit of the graphite crystal. Graphite has long been used as lubricant, burn-out material or support material in the production of catalysts. In the production of shaped catalyst bodies, graphite can serve to lubricate the steel tools used and thereby reduce mechanical wear of the molding tools. For such a use, the graphites used are generally selected for their lubricating properties and used in an amount which is required for satisfactory lubrication.

For example, WO 2004/085356 describes the production of a shaped body by mixing an oxidic material with graphite and shaping the resulting mixture to give a shaped body. Further examples of the use of graphite as tabletting aid and/or as lubricant in shaped catalyst production may be found in the documents WO 01/68245, WO 2005/030393, DE-A 10 2005 035 978, EP-A 1 060 792, WO 03/078310, WO 03/78059, DE-A 10 2005 037 678 and EP-A 467 144.

In addition, graphite is also used as burn-out material in order to influence the specific surface area and pore size of a shaped catalyst body. Thus, WO 2008/087116 and DE-A 10 2007 005 606 describe processes for producing a shaped catalyst body, in which graphite is added as shaping aid to a precursor mixture and the mixture formed is shaped to the desired geometry. The shaped catalyst body is subsequently subjected to a heat treatment in which the graphite is converted into compounds which are given off in gaseous form (i.e. CO and/or $CO_2$). The graphite used in the two patent applications serves as pore former and has been removed very completely by burning out in the catalytically active shaped catalyst body.

Carbon-containing materials are also used as support material of catalysts. In organic synthesis, palladium on activated carbon is frequently used for catalytic hydrogenation reactions. Palladium-based catalysts on graphite having a high specific surface area as support material are used for dechlorination and hydrogenation reactions (see, for example, E. Diaz et al., Appl. Catal. 2010, B 99, pages 181-190 or R. F. Bueres, Catal. Today 2010, 150, pages 16-21).

Further hydrogenation catalysts using graphite as support component are described in DE 10 2004 007 499. These hydrogenation catalysts comprise rhenium as active component and are produced by applying a rhenium component to oxidatively pretreated "high surface activated graphite".

U.S. Pat. No. 4,066,712 claims a catalyst which is present as intercalate of Cr and graphite. The catalyst is used for the reforming of nonaromatic compounds to give products having an increased proportion of aromatics.

DE 4324693 describes the use of fullerene intercalates with Pd, Ru or Fe and their use as catalysts. The catalysts were tested for the example of the hydrogenation of cyclohexene in tetrahydrofuran as solvent.

In the commercial use of catalysts, a further improvement in the economics, in particular an increase of the conversion to the target product, and/or a reduction in the formation of undesirable by-products are of greatest interest.

In view of this background, it was the object of the present invention to provide an improved process for producing shaped metal oxide catalyst bodies, which results, in particular, in shaped catalyst bodies which have a higher activity and/or selectivity compared to catalysts of the prior art.

This object is achieved by the process of the invention and the catalysts which can be obtained thereby.

The increased activity of the catalysts of the invention compared to conventional catalysts makes it possible to carry out the corresponding catalytic processes at lower pressures or temperatures. This fact leads to a considerable cost saving for the plant operator. A temperature decrease in particular leads to a longer operating life of the catalyst since it slows deactivation due to sintering effects, carbonization or the by-products coating the surface. In addition, more active catalysts make it possible to carry out the corresponding reactions at higher space velocities. An equal throughput can therefore be achieved using smaller reactors, which means a considerable reduction in capital costs for a plant operator. A decrease in temperature can additionally lead to a reduction in the amount of by-products. Furthermore, improved selectivity reduces the outlay in terms of apparatus for the removal of by-products and thus the work-up costs for the product.

SUMMARY OF THE INVENTION

The invention provides a process for producing a shaped catalyst body, which comprises the following steps:
(a) Mixing of one or more metal oxides, preferably in the form of a powder, with graphite, and
(b) Shaping of this mixture to give a shaped body, where the particle diameter $D_{90}$ of the graphite is:
2.0 µm≤$D_{90}$≤17.5 µm.

The invention further provides shaped catalyst bodies which can be produced by the process of the invention.

The invention additionally provides for the use of the shaped catalyst bodies of the invention in catalytic reactions, in particular in hydrogenation and dehydrogenation reactions, hydrogenolysis reactions, CO hydrogenation and water gas shift reactions.

DETAILED DESCRIPTION OF THE INVENTION

The invention describes a shaped catalyst body which consists of a mixture of at least one metal oxide with at least one graphite having specific properties. In addition, the invention comprises a corresponding process for producing the shaped body.

For the purposes of the present invention, metal oxides are generally compounds of a metal with oxygen. The metal can be present in oxidic form in various stoichiometric compositions with the oxygen. The metal can be present in one or more different oxidation states in the metal oxide. The expression metal oxide in its general meaning also includes oxides of one or more metals in the form of a particular or a plurality of different modifications or crystal structures. In its widest meaning, the term metal oxide also includes compounds which can be converted into the metal oxides (e.g. by thermal treatment). These include, in particular, metal carbonates, metal hydroxocarbonates, metal nitrates, metal hydroxides or appropriate metal-amine compounds.

In a particularly preferred embodiment, the metal oxide is present in the form of a powder.

For the purposes of the present invention, a metal is, in its broadest meaning, any member of groups 1 to 14 (IA to VIIIA and IB to IVB of the old IUPAC nomenclature) of the Periodic Table of the Elements and also includes semimetals such as silicon.

The metal of the metal oxide is preferably selected from the group consisting of Cu, Zn, Al, Si, Ti, Mn, Ni, Cr, Fe, Co, Mo, Ca, Ba and Zr. The metal oxide can contain one or more oxides of the abovementioned metals. The metal can be present in various stoichiometric compositions with the oxygen and/or in one or more different oxidation states in the metal oxide. Thus, for example, copper oxide can be present as CuO, $Cu_2O$ or mixtures thereof, iron oxide can be present as FeO, $Fe_2O_3$, $Fe_3O_4$, $Fe_2O$ or mixtures thereof and manganese oxide can be present as MnO, $Mn_2O_3$, $Mn_3O_4$, $MnO_2$, $Mn_2O_7$ or mixtures thereof. The (at least one) metal of the metal oxide is preferably selected from the group consisting of Cu, Zn, Al, Mn, Cr and Ni. The (at least one) metal of the metal oxide is particularly preferably selected from the group consisting of Cu, Al, Zn and Mn, in particular Cu. The metal oxide can consist of a single oxide of a metal, of a plurality of oxides of a metal, of a plurality of oxides of a plurality of metals or of mixtures of the abovementioned.

In a preferred embodiment, the metal of the metal oxide is Cu supported on an oxide such as $Al_2O_3$, $SiO_2$, ZnO, $TiO_2$ or mixed compounds thereof (e.g. aluminosilicates). In a further preferred embodiment, the metal oxide comprises a mixture of metal oxides, in particular oxides of the metals (1) Cu and Al and Mn, (2) Cu and Zn, (3) Cu and Al and Zn, (4) Cu and Cr, (5) Co and Ni, (6) Cr and Fe or (7) Co and Mo.

The metal oxide is preferably obtained by precipitation of dissolved substances, in particular salts, of the abovementioned elements. If the metal oxide contains a plurality of the abovementioned metals, the metal oxide can be obtained by coprecipitation of dissolved substances of a plurality of the abovementioned metals or by separate precipitation and subsequent combining of the precipitated metal oxides. The precipitation can also be carried out sequentially. Here, the precipitation of one or more metals is effected as metal oxide at a first pH. The pH is subsequently altered, and the precipitation of at least one further metal oxide is carried out. If desired, this procedure can be carried out at one or more further pH values. The metal components present in a solution are precipitated together in space but offset over time by the sequential precipitation with variation of the pH.

Furthermore, processes which use solid starting materials are also possible. Corresponding processes are described, for example, in "Handbook of heterogenous catalysis, second edition" in chapter 2.4.1 Decomposition-Precipitation. Here, a dissolved metal component is precipitated onto a solid support substance. As an alternative, the solid metal components can also be mixed with one or more solid support substances and subsequently shaped (optionally with addition of graphite).

The metal oxide can usually be produced by generally known production processes as are described, for example, in EP 0 552 463 or WO 2007/006719 A1. Further customary production processes are likewise described in "Handbook of heterogenous catalysis, second edition", for example in the chapters 2.3.3 Precipitation and Coprecipitation, 2.3.4 Sol-Gel Process and 2.3.12 Solid-State Reactions.

The preparation of the abovementioned oxides is generally carried out in aqueous solution by precipitation of dissolved substances, in particular salts, of the abovementioned elements by means of an alkaline solution and subsequent ageing of the precipitation product in the mother liquor. The aged precipitation product is subsequently filtered off from the mother liquor and optionally subjected to further steps such as washing and/or calcination.

As metal salts, it is in principle possible to use all salts of metals which are readily soluble in water, in particular the nitrates, chlorides and/or sulfates thereof. For example, copper, zinc and/or aluminum can be used in the form of metal salts, in particular in the form of copper nitrate, zinc nitrate and/or aluminum nitrate.

As alkaline precipitation reagent (base), it is in principle possible to use any basic aqueous solution which does not adversely affect the process and the catalyst obtainable thereby. It has been found that aqueous solutions of alkali metal compounds, alkaline earth metal compounds and/or ammonium compounds, in particular of alkali metal compounds and/or ammonium compounds, preferably of alkali metal compounds, particularly preferably the carbonates, hydrogencarbonates, and/or hydroxides thereof are particularly suitable. Particular preference is given to using aqueous solutions of alkali metal carbonates, alkali metal hydrogencarbonates, alkali metal hydroxides such as sodium hydroxide and potassium hydroxide, ammonium carbonate and/or ammonium hydrogen carbonate, more preferably aqueous solutions of sodium carbonate or sodium hydrogen carbonate, as basic solution.

Furthermore, additives can also be mixed in. These include pore formers, lubricants, rheological auxiliaries, binders and other materials (e.g. metal powders) which can contribute to stability.

The mixing of the metal oxide with the graphite, optionally in the presence of one or more solid support substances, can be carried out by methods which are known to those skilled in the art and ensure good mixing. For example, the mixing can be carried out in intensive mixers such as Eirich mixers or else by means of Pflugschaar mixers or Lodiger mixers. In addition, kneaders can also be used for mixing of powders.

After mixing, the mixture containing metal oxide and graphite is shaped by processes known to those skilled in the art to give shaped catalyst bodies, e.g. extrudates such as rods or ribbed rods, tablets, rings, annular tablets, spheres, pellets, honeycomb bodies, granules or similar shaped bodies. The catalysts are preferably used as tablets, extrudates or pellets.

These processes include, inter alia, tabletting, extrusion, granulation and pelletization. Shaping to give shaped catalyst bodies is preferably carried out by tabletting or extrusion.

For tabletting, the metal oxide and the graphite are preferably mixed dry and subsequently tabletted.

For the shaped catalyst body of the invention, use is made of, in particular, graphites which can also be used as electrode material or as hydrogen stores. They are characterized by a comparatively large specific surface area $O_G$ (for example about 10 $m^2/g$ or more) and a comparatively small particle size (expressed, for example, by a particle diameter $D_{90}$ of about 17.5 μm or less). These graphites differ in this respect from graphites which are used for their lubricating effect and usually have a specific surface area $O_G$ in the range from 3 to 8 $m^2/g$ and a particle diameter $D_{50}$ for graphite flocs in the range from 100 to 600 μm or for graphite powders in the range from 45 to 150 μm. It has been found that the large specific surface area ($O_G$) and the small particle size of the graphites used for the shaped catalyst bodies of the invention can lead to an increase in the electrical and thermal conductivity and/or the hydrogen adsorption capability of the shaped catalyst bodies.

The specific surface area $O_G$ of the graphite used according to the invention is usually in the range from 10 m²/g to 1000 m²/g. The graphite preferably has a specific surface area $O_G$ in the range from 50 m²/g to 900 m²/g, in particular in the range from 100 m²/g to 800 m²/g. In a particularly preferred embodiment, the graphite used has a specific surface area $O_G$ in the range from 300 m²/g to 600 m²/g.

The specific surface area $O_G$ is determined by the BET method in accordance with DIN ISO 9277. The values for the specific surface area $O_G$ of the graphites used do not change under the conditions mentioned herein and therefore also apply to the catalysts of the invention.

The graphite used according to the invention has a particle diameter $D_{90}$ in the range from 2.0 µm to 17.5 µm, in particular in the range from 4.0 µm to 17.5 µm, preferably in the range from 5.0 µm to 15.0 µm and very particularly preferably in the range from 6.0 µm to 10.0 µm.

In a preferred embodiment, the graphite used according to the invention has a particle diameter $D_{10}$ in the range from 1.0 µm to 4.0 µm and preferably in the range from 1.1 µm to 3.2 µm.

In a further embodiment, the graphite used according to the invention has a particle diameter $D_{50}$ in the range from 2.0 µm to 9.0 µm and preferably in the range from 2.5 µm to 8.0 µm.

The particle diameter $D_{90}$ means that 90% of the particles are smaller than the value indicated. The particle diameter $D_{50}$ means that 50% of the particles are smaller than the value indicated. The particle diameter $D_{10}$ means that 10% of the particles are smaller than the value indicated. All D values reported in this application are based on the sample volume.

The determination of the particle sizes was carried out by the laser light scattering method in accordance with DIN ISO 13320 using a Malvern Mastersizer 2000 according to the manufacturer's instructions, including in respect of sample pretreatment: the sample is homogenized in deionized water without addition of auxiliaries and treated with ultrasound for five minutes. The D values indicated are based on the sample volume. A definition of the D values may be found, for example, in the textbook "Particle Size Measurements—Fundamentals, Practice, Quality; Henk G. Merkus, 2009, Springer Science+Business Media B.V., chapter 2". The values for the particle sizes of the graphites used do not change under the conditions mentioned herein and therefore also apply to the catalysts of the invention.

The graphite used preferably has the following particle sizes:

4.0 µm ≤ $D_{90}$ ≤ 17.5 µm,
2.0 µm ≤ $D_{50}$ ≤ 9.0 µm and
1.0 µm ≤ $D_{10}$ ≤ 4.0 µm.

The graphite used particularly preferably has the following particle sizes:

6.0 µm ≤ $D_{90}$ ≤ 10.0 µm,
2.5 µm ≤ $D_{50}$ ≤ 8.0 µm and
1.1 µm ≤ $D_{10}$ ≤ 3.2 µm.

The graphite used according to the invention usually has a thermal conductivity of from 120 to 250 W/m*K, preferably from 130 to 200 W/m*K, particularly preferably from 140 to 170 W/m*K.

The thermal conductivity is determined in accordance with DIN 51936.

The graphite used according to the invention usually has an electrical conductivity parallel to the layer structure of from $1.5*10^6$ to $8*10^6$ S/m, preferably from $2*10^6$ to $6*10^6$ S/m, particularly preferably from $2.5*10^6$ to $5*10^6$ S/m.

The electrical conductivity is determined as the reciprocal of the resistance. The procedure is as described in DIN 51911.

For the purposes of the invention, graphite includes natural graphite, synthetic graphite and also graphite modifications, which encompass expanded graphite, graphite intercalation compounds and graphite nanofibers (GNF) or carbon nanotubes (CNT), and also mixtures thereof. Particular preference is given to using synthetic graphite. Graphite can be obtained with many different properties from many manufacturers and suppliers. Graphites suitable for use according to the invention can be obtained, for example, from Asbury, USA, TIMCAL, Switzerland, Graphit Kropfmühl AG, Germany or NGS Naturgraphit GmbH, Germany.

In specific embodiments, mixtures of various graphites are also used as starting material for the catalysts of the invention. These are, in particular, combinations of graphites having different properties which in each case have a positive effect on the catalyst properties or the production process.

In one embodiment, the graphite is mixed in an amount of from 0.1 to 20.0% by weight, based on the total weight of the mixture of metal oxide and graphite, with the metal oxide. The graphite is preferably mixed in an amount of from 1.0 to 14.0% by weight, in particular from 2.0 to 12.0% by weight, particularly preferably from 4.0 to 10.0% by weight, based on the total weight of the mixture of metal oxide and graphite, with the metal oxide.

The conditions during the process for producing the shaped catalyst body are preferably selected so that 50% by weight or more, preferably 60% by weight or more, particularly preferably 95% by weight or more, of the weight of graphite used in the shaped catalyst bodies (calculated as amount of pure carbon), for example from 96 to 99.5% by weight, in particular essentially the entire weight of the graphite used, remains in the shaped catalyst body. The expression "remains" as used here means that the graphite is not converted into gaseous carbon-containing compounds (i.e., for example, not oxidized to carbon monoxide and/or carbon dioxide or reduced to gaseous hydrocarbons such as $CH_4$) which can be given off from the shaped catalyst body under the conditions of the production process.

To determine the graphite content (calculated as amount of pure carbon) in the shaped catalyst precursor body obtained, it is possible, for example, to comminute a representative number of the respective shaped bodies to a powder. The determination is then carried out on an in each case identical proportion which, in absolute terms, advantageously has a mass of from 20 to 50 mg. This pulverulent sample is then introduced in the presence of an oxygen stream into a horizontal fused silica tube heated to about 1000° C. and ignited. The combustion gas obtained here is passed through an IR cell and the amount of carbon dioxide present therein is determined quantitatively by infrared absorption. The respective graphite content (calculated as amount of pure carbon) can be back-calculated from the amount of carbon dioxide detected. Should other carbon sources (e.g. carbonates) be present, they have to be determined separately and subtracted from the total amount of carbon in order to obtain the graphite content.

In one embodiment, the shaped body obtained in step (b) is reduced by means of a reducing gas or a liquid reducing agent, optionally with heat treatment, in a step (c). The reducing gas used is preferably hydrogen. The liquid reducing agent used is preferably methanol, ethanol, formic acid, hydrazine and/or derivatives of hydrazine. The temperature in step (c) is usually dependent on the metal oxide used and is, when a reducing gas is used, preferably in the range from 150° C. to 450° C., more preferably in the range from 170° C. to 350° C. and particularly preferably in the range from 200° C. to 300° C. When a liquid reducing agent is used, the temperature in step (c) is usually dependent on the liquid reducing agent used and is preferably in the range from 20° C. to the boiling point of the liquid reducing agent at the prevailing pressure, preferably in the range from 20 K below the boiling point to the boiling point of the liquid reducing agent and in particular at about the boiling point of the liquid reducing agent. For example, the temperature in step (c) when hydrazine is used as liquid reducing agent at a pressure of 1013 mbar is preferably in the range from 20° C. to 114° C., particularly preferably in the range from 90° C. to 114° C., in particular about 114° C.

Step (c) preferably also comprises stabilization of the reduced mixture. The reduced mixture can be stabilized wet or dry. In the case of wet stabilization, the reduced mixture is covered with solvent. Preference is given to using solvents having a low vapor pressure, for example isodecanol.

In the case of dry stabilization, a mixture of oxygen or an oxygen-containing gas, preferably air, and an inert gas such as argon or nitrogen is introduced into the reduction reactor. The concentration of oxygen in the mixture is preferably increased from about 0.04% by volume to about 21% by volume. For example, a mixture of air and inert gas in which the ratio of air to inert gas is initially about 0.2% by volume of air to 99.8% by volume of inert gas can be fed in. The ratio of air to inert gas is then gradually increased (e.g. continuously or stepwise) until finally 100% by volume, for example, of air, is fed in (which corresponds to an oxygen concentration of about 21% by volume). Without being tied to a theory, it is presumed that the introduction of air or oxygen results in formation of a thin oxide layer having a thickness of, for example, from 0.5 to 50 nm, preferably from 1 to 20 nm, in particular from 1 to 10 nm, on the catalyst surface, which protects the catalyst from further oxidation. In the case of dry stabilization, the reactor temperature is generally 100° C. or less, preferably from 20 to 70° C. and particularly preferably from 30 to 50° C. After this stabilization, the catalyst is "transportable" and can be transported to the user/plant operator. If the catalyst user carries out step (c) in situ in the reactor, stabilization is dispensed with.

The reduction conditions are preferably selected so that 50% by weight or more, preferably 60% by weight or more, particularly preferably 95% by weight or more of the weight of graphite (calculated as amount of pure carbon) present in the shaped catalyst bodies, for example from 96 to 99.5% by weight, in particular essentially the entire weight of the graphite used, remains in the shaped catalyst bodies.

In a preferred embodiment, the shaped body obtained in step (b) is not subjected to any further heat treatment under oxidizing conditions.

In a further embodiment, the shaped body obtained in step (b) can be subjected to a thermal treatment in a step (d), insofar as this is, for example, necessary for curing of added binders, for example in the production of extrudates, or for removal of pore formers. This step (d) can be carried out before, after or instead of the reduction step (c). The thermal treatment in step (d) is carried out at a temperature at which 50% by weight or more, preferably 60% by weight or more, particularly preferably 95% by weight or more, of the weight of graphite (calculated as amount of pure carbon) present in the shaped catalyst bodies, for example from 96 to 99.5% by weight, in particular essentially the entire weight of the graphite used, remains in the shaped catalyst bodies. This heat treatment is preferably carried out in the range from 150 to 550° C., particularly preferably in the range from 200 to 450° C. and very particularly in the range from 250 to 350° C. The treatment is usually carried out under nitrogen, argon or air.

As a result of steps (c) or (d), the values for the graphite content in the end product can differ from those of shaped bodies after step (b). For this purpose, for example, the degree of reduction of the metal components reduced by means of step (c) has to be taken into account. The reduction can, for example, convert metal oxides into the corresponding metals. Removal of the oxygen generally leads to a reduction in the total mass of the catalyst, as a result of which the graphite content based on the total mass of the catalyst can vary. Similarly, the curing of binders or the thermal removal of pore formers in step (d) can result in an increase in the percentage of graphite in the end product. The graphite content can as a result vary by up to 30% by weight compared to the initial content.

The catalysts produced by the process of the invention are suitable for use in numerous reactions. This includes reactions in which hydrogen can occur as starting material, intermediate or product (both in molecular and atomic form). These reactions are, in particular, hydrogenation and dehydrogenation reactions, hydrogenolysis reactions, CO hydrogenation, synthesis gas production and water gas shift reactions.

Possible reactions include synthesis gas reactions, methanol syntheses, Fischer-Tropsch synthesis, pyridine syntheses, ester hydrogenolyses, amination reactions, N-alkylations, hydrogenations of nitriles to amines, hydrogenation of acrylonitrile, hydrogenation of fatty acid esters, hydrogenation of diesters to diols (in particular maleic esters), hydrogenation of sugars to polyols, alkylation of a phenol by means of an alcohol, amination of an alcohol, dehydrogenation of an alcohol, hydrogenation of an aldehyde, hydrogenation of an amide, hydrogenation of a fatty acid, e.g. by means of esterification and subsequent hydrogenolysis, selective hydrogenation of a fat, selective hydrogenation of an oil, hydrogenation of a nitrile, hydrogenation of a nitroaromatic hydrocarbon, hydrogenation of a ketone, hydrogenation of furfural, hydrogenation of an ester and hydrogenation of carbon monoxide to form methanol.

In a preferred embodiment, the catalysts produced by the process of the invention are used for the hydrogenation of carbonyl compounds, in particular for the hydrogenation of aldehydes, ketones, carboxylic acids and/or esters thereof or dicarboxylic acids and/or diesters thereof, very particularly preferably for the hydrogenation of fatty acid esters, in particular fatty acid alkyl esters, preferably fatty acid methyl esters or maleic esters.

Preferred embodiments of the invention are described below.

1. A process for producing a shaped catalyst body, which comprises the following steps:
   (a) Mixing of a metal oxide, preferably in the form of a powder, with graphite, and
   (b) Shaping of this mixture to give a shaped body, where the particle diameter $D_{90}$ of the graphite is:
   $2.0\ \mu m \leq D_{90} \leq 17.5\ \mu m$.
2. The process as per embodiment 1, wherein the specific surface area $O_G$ of the graphite is:

$10 \text{ m}^2/\text{g} \leq O_G \leq 1000 \text{ m}^2/\text{g}$, preferably $300 \text{ m}^2/\text{g} \leq O_G \leq 600 \text{ m}^2/\text{g}$.

3. The process as per embodiment 1 or 2, wherein the particle diameter $D_{90}$ of the graphite is:
   $4.0 \text{ μm} \leq D_{90} \leq 17.5 \text{ μm}$,
   preferably $5.0 \text{ μm} \leq D_{90} \leq 15.0 \text{ μm}$,
   in particular $6.0 \text{ μm} \leq D_{90} \leq 10.0 \text{ μm}$.

4. The process as per embodiment 1, 2 or 3, wherein the particle diameter $D_{50}$ of the graphite is:
   $2.0 \text{ μm} \leq D_{50} \leq 9.0 \text{ μm}$, preferably $2.5 \text{ μm} \leq D_{50} \leq 8.0 \text{ μm}$.

5. The process as per embodiment 1, 2, 3 or 4, wherein the particle diameter $D_n$ of the graphite is:
   $1.0 \text{ μm} \leq D_{10} \leq 4.0 \text{ μm}$, preferably $1.1 \text{ μm} \leq D_{10} \leq 3.2 \text{ μm}$.

6. The process as per embodiment 1, 2, 3, 4 or 5 wherein the graphite has the following particle diameters:
   $4.0 \text{ μm} \leq D_{90} \leq 17.5 \text{ μm}$
   $2.0 \text{ μm} \leq D_{50} \leq 9.0 \text{ μm}$ and
   $1.0 \text{ μm} \leq D_{10} \leq 4.0 \text{ μm}$,
   preferably:
   $6.0 \text{ μm} \leq D_{90} \leq 10.0 \text{ μm}$,
   $2.5 \text{ μm} \leq D_{50} \leq 8.0 \text{ μm}$ and
   $1.1 \text{ μm} \leq D_{10} \leq 3.2 \text{ μm}$.

7. The process as per any of the preceding embodiments, wherein the mixture of step (a) contains graphite in an amount of from 0.1 to 20.0% by weight, preferably in the range from 1.0 to 14.0% by weight, in particular in the range from 2.0 to 12.0% by weight, particularly preferably in the range from 4.0 to 10.0% by weight, based on the total weight of the metal oxide/graphite mixture.

8. The process as per any of the preceding embodiments, wherein graphite comprises a mixture of various graphites.

9. The process as per any of the preceding embodiments, wherein the metal oxide is selected from among copper oxide, zinc oxide, aluminum oxide, silicon oxide, titanium oxide, manganese oxide, nickel oxide, chromium oxide, iron oxide, cobalt oxide, molybdenum oxide, calcium oxide, barium oxide, zirconium oxide and mixtures thereof, preferably copper oxide, zinc oxide, aluminum oxide, manganese oxide, chromium oxide, nickel oxide and mixtures thereof, in particular copper oxide, aluminum oxide, zinc oxide, manganese oxide and mixtures thereof, and is particularly preferably copper oxide; the metal of the metal oxide is preferably present independently in one oxidation state and/or in a plurality of different oxidation states.

10. The process as per any of the preceding embodiments, which comprises the following step:
(c) Reduction of the shaped body obtained in step (b) by means of a reducing gas, in particular hydrogen, or a liquid reducing agent, in particular methanol, ethanol, formic acid, hydrazine and/or derivatives of hydrazine,
where step (c) optionally comprises a further step selected from among:
   (i) stabilization of the reduced mixture by covering the reduced mixture with an inert solvent, in particular isodecanol, and
   (ii) stabilization of the reduced mixture by introduction of a mixture of an oxygen-containing gas such as air and an inert gas such as argon or nitrogen, preferably at a reactor temperature of less than 100° C., into the reduction reactor, with the concentration of oxygen in the mixture preferably being increased from about 0.04% by volume to about 21% by volume.

11. The process as per any of the preceding embodiments, which comprises the following step:

(d) thermal treatment of the shaped body obtained in step (b), optionally before, during or after reduction by means of a reducing gas, in particular hydrogen, or a reducing liquid, in particular methanol, ethanol, formic acid, hydrazine and/or derivatives of hydrazine, at a temperature at which 50% by weight or more, preferably 60% by weight or more, particularly preferably 95% by weight or more, of the weight of graphite (calculated as amount of pure carbon) present in the shaped catalyst bodies, in particular essentially the entire weight of the graphite used, remains in the shaped catalyst bodies.

12. The process as per embodiment 11, wherein the temperature in step (d) is in the range from 150° C. to 550° C., preferably in the range from 250° C. to 350° C.

13. The process as per any of the preceding embodiments, wherein the shaping in step (b) is carried out by a process selected from among tabletting, extrusion, granulation and pelletization.

14. The process as per any of the preceding embodiments, wherein the graphite has a thermal conductivity of from 120 to 250 W/m*K, preferably from 130 to 200 W/m*K, particularly preferably from 140 to 170 W/m*K.

15. The process as per any of the preceding embodiments, wherein the graphite has an electrical conductivity parallel to the layer structure of from $1.5*10^6$ to $8*10^6$ S/m, preferably from $2*10^6$ to $6*10^6$ S/m, particularly preferably from $2.5*10^6$ to $5*10^6$ S/m.

16. A shaped catalyst body obtainable by a process as per any of the preceding embodiments.

17. The shaped catalyst body as per embodiment 16, which comprises from 2 to 90% by weight of graphite (calculated as amount of pure carbon), preferably from 3 to 20% by weight, in particular from 5 to 10% by weight, based on the total weight of the shaped catalyst body.

18. The use of the shaped catalyst body as per embodiment 16 or 17 as catalyst for a reaction in which hydrogen functions as reactant and is consumed or formed during the reaction.

19. The use of the shaped catalyst body as per embodiment 16, 17 or 18 as catalyst for a reaction from the group consisting of hydrogenation and dehydrogenation reactions, hydrogenolysis reactions, CO hydrogenation, synthesis gas production and water gas shift reactions.

20. The use as per embodiment 19, wherein the reaction is selected from the group consisting of hydrogenation reactions, dehydrogenation reactions, synthesis gas reactions, methanol syntheses, Fischer-Tropsch synthesis, pyridine syntheses, ester hydrolyses, amination reactions, N-alkylations, hydrogenations of nitriles to amines, hydrogenation of acrylonitrile, hydrogenation of fatty acid esters, hydrogenation of diesters to diols (in particular maleic esters), hydrogenation of sugars to polyols, alkylation of a phenol by means of an alcohol, amination of an alcohol, dehydrogenation of an alcohol, hydrogenation of an aldehyde, hydrogenation of an amide, hydrogenation of a fatty acid, e.g. by esterification and subsequent hydrogenolysis, selective hydrogenation of a fat, selective hydrogenation of an oil, hydrogenation of a nitrile, hydrogenation of a nitroaromatic hydrocarbon, hydrogenation of a ketone, hydrogenation of furfural, hydrogenation of an ester and hydrogenation of carbon monoxide to form methanol.

21. The use as per embodiment 19 or 20, wherein the reaction is a hydrogenation of carbonyl compounds, in particular the hydrogenation of aldehydes, ketones, carboxylic acids, dicarboxylic acids or carboxylic acid and dicarboxylic acid derivatives and/or esters thereof.

22. The use as per embodiment 19, 20 or 21, wherein the reaction is a hydrogenation of fatty acid esters.
23. A shaped catalyst body comprising
    (i) a metal and/or a metal oxide, where the metal is selected from the group consisting of Cu, Zn, Al, Si, Ti, Mn, Ni, Cr, Fe, Co, Mo, Ca, Ba, Zr and mixtures thereof and the metal oxide is selected from among copper oxide, zinc oxide, aluminum oxide, silicon oxide, titanium oxide, manganese oxide, nickel oxide, chromium oxide, iron oxide, cobalt oxide, molybdenum oxide, calcium oxide, barium oxide, zirconium oxide and mixtures thereof, and
    (ii) graphite in an amount of from 0.1 to 20% by weight, preferably from 1 to 14% by weight, in particular from 2.0 to 12.0% by weight, particularly preferably from 4.0 to 10.0% by weight, calculated as amount of pure carbon and based on the total weight of the shaped catalyst body,
    characterized in that
    the particle diameter $D_{90}$ of the graphite
    2.0 μm≤$D_{90}$≤17.5 μm,
    and the specific surface area $O_G$ of the graphite is:
    10 m$^2$/g≤$O_G$≤1000 m$^2$/g;
    the metal of the metal oxide can preferably be present independently in one oxidation state and/or in a plurality of different oxidation states.
24. The shaped catalyst body as per embodiment 23, wherein the specific surface area $O_G$ of the graphite is:
    300 m$^2$/g≤$O_G$≤600 m$^2$/g.
25. The shaped catalyst body as per embodiment 23 or 24, wherein the particle diameter $D_{90}$ of the graphite is:
    4.0 μm≤$D_{90}$≤17.5 μm,
    preferably 5.0 μm≤$D_{90}$≤15.0 μm,
    in particular 6.0 μm≤$D_{90}$≤10.0 μm.
26. The shaped catalyst body as per embodiment 23, 24 or 25, wherein the particle diameter $D_{50}$ of the graphite is:
    2.0 μm≤$D_{50}$≤9.0 μm, preferably 2.5 μm≤$D_{50}$≤8.0 μm.
27. The shaped catalyst body as per embodiment 23, 24, 25 or 26, wherein the particle diameter $D_{10}$ of the graphite is:
    1.0 μm≤$D_{10}$≤4.0 μm, preferably 1.1 μm≤$D_{10}$≤3.2 μm.
28. The shaped catalyst body as per embodiment 23, 24, 25, 26 or 27, wherein the graphite has the following particle diameters:
    4.0 μm≤$D_{90}$≤17.5 μm,
    2.0 μm≤$D_{50}$≤9.0 μm and
    1.0 μm≤$D_{10}$≤4.0 μm,
    preferably:
    6.0 μm≤$D_{90}$≤10.0 μm,
    2.5 μm≤$D_{50}$≤8.0 μm and
    1.1 μm≤$D_{10}$≤3.2 μm.
29. The shaped catalyst body as per embodiment 23, 24, 25, 26, 27 or 28, wherein the graphite has a thermal conductivity of from 120 to 250 W/m*K, preferably from 130 to 200 W/m*K, particularly preferably from 140 to 170 W/m*K.
30. The shaped catalyst body as per embodiment 23, 24, 25, 26, 27, 28 or 29, wherein the graphite has an electrical conductivity parallel to the layer structure of from 1.5*10$^6$ to 8*10$^6$ S/m, preferably from 2*10$^6$ to 6*10$^6$ S/m, particularly preferably from 2.5*10$^6$ to 5*10$^6$ S/m.
31. The shaped catalyst body as per embodiment 23, 24, 25, 26, 27, 28, 29 or 30, wherein the graphite consists of a mixture of a plurality of graphites.
32. The shaped catalyst body as per any of embodiments 23 to 31, wherein the metal is selected from among Cu, Zn, Al, Mn, Cr, Ni and mixtures thereof, preferably Cu, Zn, Al, Mn and mixtures thereof, and in particular is Cu.
33. The shaped catalyst body as per any of embodiments to 32, wherein the metal oxide is selected from among copper oxide, zinc oxide, aluminum oxide, manganese oxide, chromium oxide, nickel oxide and mixtures thereof, in particular copper oxide, aluminum oxide, zinc oxide, manganese oxide and mixtures thereof, and in particular is copper oxide.
34. The shaped catalyst body as per any of embodiments to 32, wherein the metal oxide comprises: (1) mixtures of copper oxide, aluminum oxide and manganese oxide, (2) mixtures of copper oxide and zinc oxide, (3) mixtures of copper oxide, aluminum oxide and zinc oxide, (4) mixtures of copper oxide and chromium oxide, (5) cobalt oxide and nickel oxide, (6) chromium oxide and iron oxide, or (7) cobalt oxide and molybdenum oxide.
35. A process for producing a shaped catalyst body as per any of embodiments 23 to 34, which comprises the following steps:
    (a) Mixing of the metal oxide, preferably in the form of a powder, with graphite, and
    (b) Shaping of this mixture to give a shaped body, where the particle diameter $D_{90}$ of the graphite is:
    2.0 μm≤$D_{90}$≤17.5 μm.
36. The process as per embodiment 35, wherein the specific surface area $O_G$ of the graphite is:
    10 m$^2$/g≤$O_G$≤1000 m$^2$/g, preferably
    300 m$^2$/g≤$O_G$≤600 m$^2$/g.
37. The process as per embodiment 35 or 36, wherein the particle diameter $D_{90}$ of the graphite is:
    4.0 μm≤$D_{90}$≤17.5 μm,
    preferably 5.0 μm≤$D_{90}$≤15.0 μm,
    in particular 6.0 μm≤$D_{90}$≤10.0 μm.
38. The process as per embodiment 35, 36 or 37, wherein the particle diameter $D_{50}$ of the graphite is:
    2.0 μm≤$D_{50}$≤9.0 μm, preferably 2.5 μm≤$D_{50}$≤8.0 μm.
39. The process as per embodiment 35, 36, 37 or 38, wherein the particle diameter $D_{10}$ of the graphite is:
    1.0 μm≤$D_{10}$≤4.0 μm, preferably 1.1 μm≤$D_{10}$≤3.2 μm.
40. The process as per embodiment 35, 36, 37, 38 or 39, wherein the graphite has the following particle diameters:
    4.0 μm≤$D_{90}$≤17.5 μm
    2.0 μm≤$D_{50}$≤9.0 μm and
    1.0 μm≤$D_{10}$≤4.0 μm,
    preferably:
    6.0 μm≤$D_{90}$≤10.0 μm,
    2.5 μm t $D_{50}$≤8.0 μm and
    1.1 μm≤$D_{10}$≤3.2 μm.
41. The process as per embodiment 35, 36, 37, 38, 39 or 40, wherein the mixture of step (a) contains graphite in an amount of from 0.1 to 20.0% by weight, preferably in the range from 1.0 to 14.0% by weight, in particular in the range from 2.0 to 12.0% by weight, particularly preferably in the range from 4.0 to 10.0% by weight, based on the total weight of the metal oxide/graphite mixture.
42. The process as per embodiment 35, 36, 37, 38, 39, or 41, wherein graphite comprises a mixture of various graphites.
43. The process as per embodiment 35, 36, 37, 38, 39, 40, 41 or 42, wherein the metal oxide is selected from among copper oxide, zinc oxide, aluminum oxide, silicon oxide, titanium oxide, manganese oxide, nickel oxide, chromium oxide, iron oxide, cobalt oxide, molybdenum oxide, calcium oxide, barium oxide, zirconium oxide and mixtures thereof, preferably copper oxide, zinc oxide, aluminum oxide, manganese oxide, chromium oxide, nickel oxide and mixtures thereof, in particular copper oxide, aluminum oxide, zinc oxide, manganese oxide and mixtures thereof, and is particularly preferably copper oxide.

44. The process as per any of embodiments 35 to 43, which comprises the following step:

(c) Reduction of the shaped body obtained in step (b) by means of a reducing gas, in particular hydrogen, or a reducing liquid, in particular methanol, ethanol, formic acid, hydrazine and/or derivatives of hydrazine, where step (c) optionally comprises a further step selected from among:

(i) stabilization of the reduced mixture by covering the reduced mixture with an inert solvent, in particular isodecanol, and (ii) stabilization of the reduced mixture by introduction of a mixture of an oxygen-containing gas such as air and an inert gas such as argon or nitrogen, preferably at a reactor temperature of less than 100° C., into the reduction reactor, with the concentration of oxygen in the mixture preferably being increased from about 0.04% by volume to about 21% by volume.

45. The process as per any of embodiments 35 to 44, which comprises the following step:

(d) thermal treatment of the shaped body obtained in step (b), optionally before, during or after reduction by means of a reducing gas, in particular hydrogen, or a reducing liquid, in particular methanol, ethanol, formic acid, hydrazine and/or derivatives of hydrazine, at a temperature at which 50% by weight or more, preferably 60% by weight or more, particularly preferably 95% by weight or more, of the weight of graphite (calculated as amount of pure carbon) present in the shaped catalyst bodies, for example 96 to 99.5% by weight, in particular essentially the entire weight of the graphite used, remains in the shaped catalyst bodies.

46. The process as per embodiment 45, wherein the temperature in step (d) is in the range from 150° C. to 550° C., preferably in the range from 250° C. to 350° C.

47. The process as per any of embodiments 35 to 46, wherein the shaping in step (b) is carried out by a process selected from among tabletting, extrusion, granulation and pelletization.

48. The process as per any of embodiments 35 to 47, wherein the graphite has a thermal conductivity of from 120 to 250 W/m*K, preferably from 130 to 200 W/m*K, particularly preferably from 140 to 170 W/m*K.

49. The process as per any of embodiments 35 to 48, wherein the graphite has an electrical conductivity parallel to the layer structure of from $1.5*10^6$ to $8*10^6$ S/m, preferably from $2*10^6$ to $6*10^6$ S/m, particularly preferably from $2.5*10^6$ to $5*10^6$ S/m.

50. The use of the shaped catalyst body as per any of embodiments 23 to 34 as catalyst for a reaction in which hydrogen functions as reactant and is consumed or formed during the reaction.

51. The use as per embodiment 50, wherein the reaction is selected from the group consisting of hydrogenation reactions, dehydrogenation reactions, synthesis gas reactions, methanol syntheses, Fischer-Tropsch synthesis, pyridine syntheses, ester hydrolyses, amination reactions, N-alkylations, hydrogenations of nitriles to amines, hydrogenation of acrylonitrile, hydrogenation of fatty acid esters, hydrogenation of diesters to diols (in particular maleic esters), hydrogenation of sugars to polyols, alkylation of a phenol by means of an alcohol, amination of an alcohol, dehydrogenation of an alcohol, hydrogenation of an aldehyde, hydrogenation of an amide, hydrogenation of a fatty acid, e.g. by esterification and subsequent hydrogenolysis, selective hydrogenation of a fat, selective hydrogenation of an oil, hydrogenation of a nitrile, hydrogenation of a nitroaromatic hydrocarbon, hydrogenation of a ketone, hydrogenation of furfural, hydrogenation of an ester and hydrogenation of carbon monoxide to form methanol.

52. The use as per embodiment 50 or 51, wherein the reaction is a hydrogenation of carbonyl compounds, in particular the hydrogenation of aldehydes, ketones, carboxylic acids, dicarboxylic acids or carboxylic acid and dicarboxylic acid derivatives and/or esters thereof.

53. The use as per embodiment 52, wherein the reaction is a hydrogenation of fatty acid esters.

The invention is illustrated in further detail by the following, nonlimiting examples. Even though these examples describe specific embodiments of the invention, they serve merely to illustrate the invention and should not be interpreted as restricting the invention in any way. As a person skilled in the art will know, numerous modifications can be made thereto without deviating from the scope of protection of the invention, as is defined by the attached claims.

EXAMPLES

Reference Example 1

Preparation of a Metal Oxide

The preparation of the metal oxide is carried out by the process described in EP 0 552 463. The metal oxide is prepared by means of precipitation from the corresponding metal salt solutions and subsequent calcination.

Solution 1 is produced from 1234 g of $Cu(NO_3)_2 \times 3\ H_2O$, 212 g of $Mn(NO_3)_2 \times 4\ H_2O$, 1750 g of $Al(NO_3)_3 \times 9\ H_2O$ and 10 l of deionized $H_2O$. Solution 2 is produced from 1700 g of $Na_2CO_3$ and 7.6 l of deionized $H_2O$. The two solutions are heated to 80° C. while stirring. They are subsequently metered into a precipitation vessel. The volume flows of solutions 1 and 2 are set so that the pH in the precipitation vessel is 6.8. As soon as the two solutions have been consumed, the precipitate formed is filtered off and washed with deionized water. The filter cake is then resuspended in about 1 l of water and spray dried. The resulting dried powder is calcined at 750° C. for 2 hours in a convection furnace.

Example 1

Production of the Shaped Catalyst Bodies

To produce the catalysts, the metal oxide obtained in reference example 1 was used in each case and mixed with the amounts indicated in table 1 of the respective graphite and tabletted to give shaped bodies having a diameter of about 3 mm and a height of about 3 mm. Activation is carried out by reduction by means of hydrogen at 230° C. for 2 hours. Since the reduction was carried out directly in the test reactor for the activity test, stabilization of the catalyst was not necessary.

900 g of the catalyst powder and 18.4 g of the appropriate graphite were in each case introduced into an Eirich mixer and homogenized dry for 15 minutes. The powder was subsequently tabletted on a Korsch tabletting press to give tablets having a diameter of about 3 mm and a height of about 3 mm and a target lateral compressive strength of 85 N. The lateral compressive strength was determined in accordance with DIN EN 1094-5. The lateral compressive strength indicated is the arithmetic mean of 100 measurements.

TABLE 1

Particle sizes $D_{90}$, $D_{50}$, $D_{10}$ and the specific surface area $O_G$ of the graphites used

| Graphite | $D_{90}$ in µm | $D_{50}$ in µm | $D_{10}$ in µm | $O_G$ in m²/g |
|---|---|---|---|---|
| #1 | 43.0 | 13.2 | 2.8 | 115 |
| #2 | 32.1 | 6.0 | 1.2 | 301 |
| #3 | 39.6 | 5.5 | 0.2 | 405 |
| #4 | 27.8 | 1.9 | 0.1 | 470 |
| #5 | 110.1 | 36.4 | 7.3 | 4 |
| #6 | 55.8 | 23.1 | 5.3 | 6.5 |
| #7 | 17.2 | 8.0 | 3.1 | 12 |
| #8 | 6.5 | 3.4 | 1.6 | 20 |
| #9 | 4.7 | 2.4 | 1.2 | 26 |

TABLE 2

Amount of graphite used in the production of the catalysts

| Catalyst | Graphite | Amount in % by weight |
|---|---|---|
| Catalyst 1 | #1 | 2 |
| Catalyst 2 | #2 | 2 |
| Catalyst 3 | #3 | 2 |
| Catalyst 4 | #4 | 2 |
| Catalyst 5 | #5 | 2 |
| Catalyst 6 | #6 | 2 |
| Catalyst 7 | #7 | 2 |
| Catalyst 8 | #8 | 2 |
| Catalyst 9 | #9 | 2 |
| Catalyst 10 | #7 | 1 |
| Catalyst 11 | #7 | 4 |
| Catalyst 12 | #7 | 8 |
| Catalyst 13 | #7 | 12 |
| Catalyst 14 | #7 | 16 |

Example 2

Hydrogenation of Fatty Acid Methyl Ester (FAME)

The activity of the catalysts is examined in respect of the hydrogenation of fatty acid methyl ester (FAME).

For this purpose, an electrically heated fixed-bed reactor having a reactor volume of 25 ml is used. Methyl laurate (C12-methyl ester) is used for the test.

To evaluate the ester conversion and the selectivity to the fatty alcohol and/or the formation of by-products, the reaction product formed is analyzed by gas chromatography. The conversion is calculated from the molar amount of ester used and the remaining molar amount of ester in the product. The selectivity to the by-product paraffin is calculated from the molar amount of ester which has been converted into paraffin.

For the analysis by means of gas chromatography, 6.0000 g of the product formed are mixed with 0.2000 g of 5-nonanol (internal standard). The sample is subsequently analyzed twice by means of a gas chromatograph.

Equipment used:

GC: Agilent 7890A with FID

Column: ZB-1, 60 m×0.25 mm from Phenomenex

Software: EZ Chrom Elite Version 3.3.2 SP1

Test conditions in the hydrogenation of methyl laurate:

Temperature: 180° C.

Pressure: 280 bar

GHSV ($H_2$): 20000 h$^{-1}$

LHSV (ester): 1.4 h$^{-1}$

Values for the activity and the selectivity obtained by the above-described method are shown in table 3 for the catalysts 1 to 4. The activity is reported as percentage conversion of the ester. The selectivity is reported as percentage value in respect of the formation of paraffins as undesirable by-product.

TABLE 3

FAME conversion and formation of
the by-product paraffin at 180° C.

|  | specific surface area $O_G$ of the graphite used [m²/g] | FAME conversion at 180° C. [%] | Formation of the by-product paraffin at 180° C. [%] |
|---|---|---|---|
| Catalyst 1 | 115 | 55.1 | 0.091 |
| Catalyst 2 | 301 | 73.2 | 0.048 |
| Catalyst 3 | 405 | 80.5 | 0.028 |
| Catalyst 4 | 470 | 90.9 | 0.019 |

Figure 1:
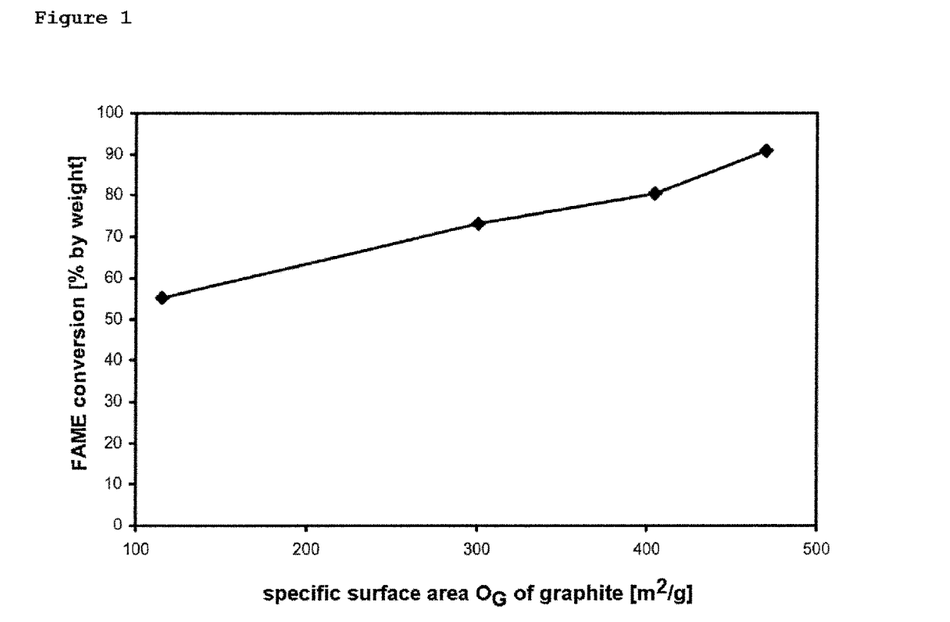
FIG. 1 shows the catalytic properties of various shaped catalyst bodies according to the invention as a function of the specific surface area $O_G$ of the graphite used. The conversion of fatty acid methyl ester in percent by weight under the following conditions: temperature: 180° C., pressure: 280 bar, GHSV ($H_2$): 20000 h$^{-1}$, LHSV (ester): 1.4 h$^{-1}$ is shown.
Figure 2:
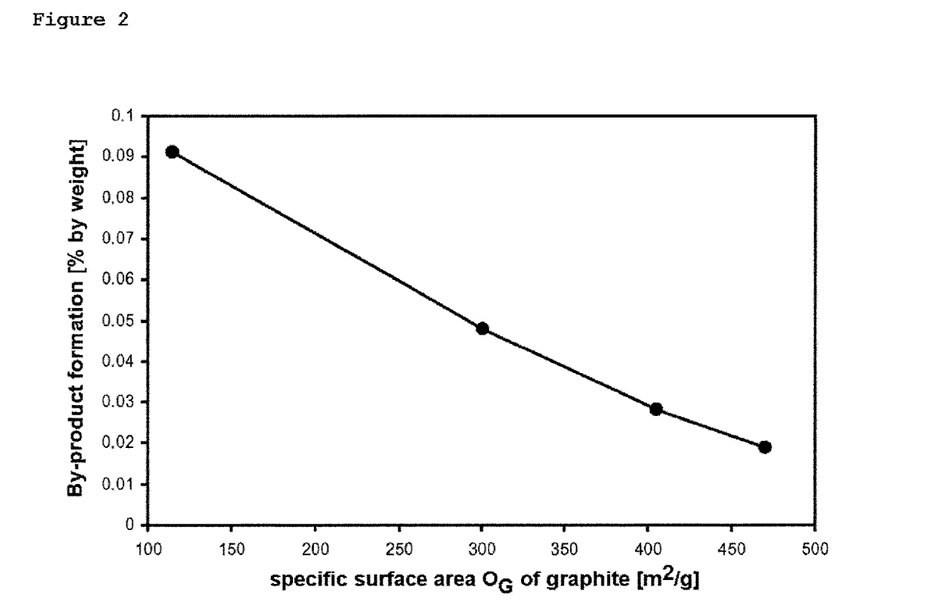
FIG. 2 shows the catalytic properties of various shaped catalyst bodies according to the invention as a function of the specific surface area $O_G$ of the graphite used. The formation of the by-product paraffin in percent by weight under the following conditions: temperature: 180° C., pressure: 280 bar, GHSV ($H_2$): 20000 h$^{-1}$, LHSV (ester): 1.4 h$^{-1}$, is shown.

The results as a function of the specific surface area $O_G$ of the graphites are shown in graph form in FIGS. 1 and 2. It can be seen that the activity (ester conversion) increases and the selectivity (formation of the undesirable by-product of the paraffins) decreases with increasing surface area.

The values for the activity and the selectivity obtained by the above-described method are shown in table 4 for the catalysts 5 to 9. The activity is reported as percentage conversion of the ester. The selectivity is reported as percentage value in respect of the formation of paraffins as undesirable by-product.

TABLE 4

FAME conversion and formation of
the by-product paraffin at 180° C.

|  | $D_{90}$ [µm] | $D_{50}$ [µm] | $D_{10}$ [µm] | FAME conversion at 180° C. [%] | Formation of the by-product paraffin at 180° C. [%] |
|---|---|---|---|---|---|
| Catalyst 5 | 121.6 | 31.6 | 4.8 | 70.6 | 0.05 |
| Catalyst 6 | 71.6 | 24.5 | 6.4 | 79.9 | 0.03 |
| Catalyst 7 | 17.2 | 8 | 3.1 | 82.3 | 0.026 |
| Catalyst 8 | 6.5 | 3.5 | 1.6 | 83.8 | 0.022 |
| Catalyst 9 | 4.7 | 2.4 | 1.2 | 76.9 | 0.029 |

Figure 3:
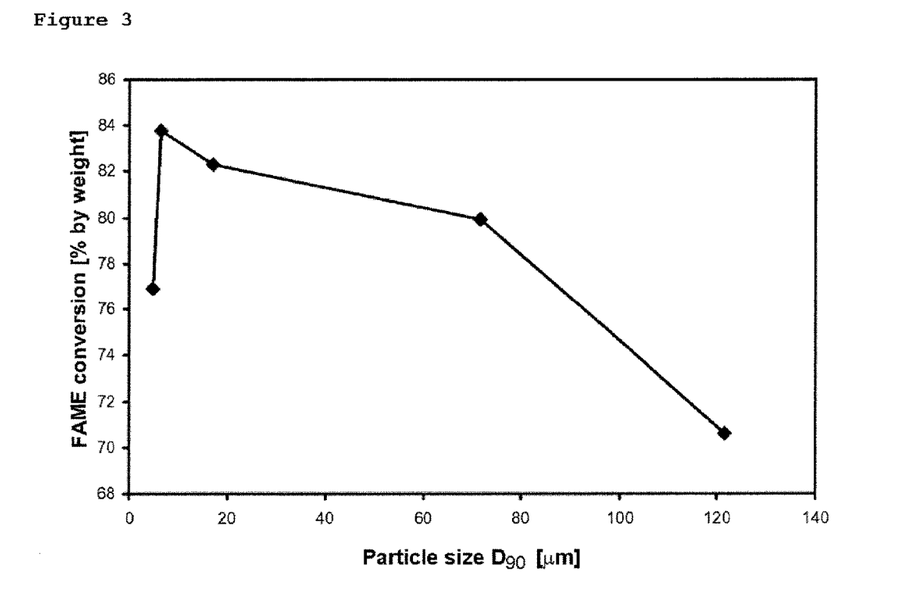
FIG. 3 shows the catalytic properties of various shaped catalyst bodies according to the invention as a function of the particle size $D_{90}$ of the graphite used. The conversion of fatty acid methyl ester in percent by weight under the following conditions: temperature: 180° C., pressure: 280 bar, GHSV ($H_2$): 20000 h$^{-1}$, LHSV (ester): 1.4 h$^{-1}$, is shown.
Figure 4:
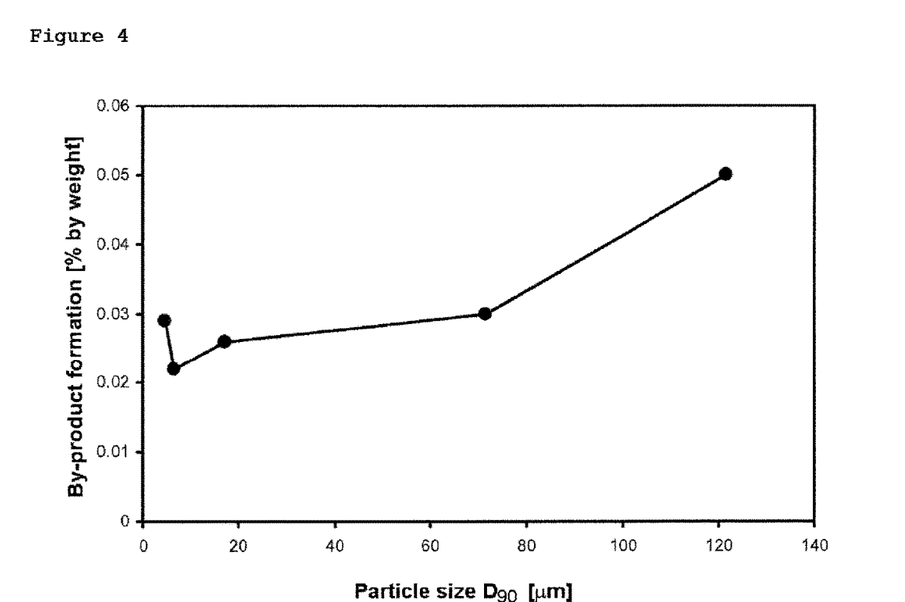
FIG. 4 shows the catalytic properties of various shaped catalyst bodies according to the invention as a function of the particle size $D_{90}$ of the graphite used. The formation of the by-product paraffin in percent by weight under the following conditions: temperature: 180° C., pressure: 280 bar, GHSV ($H_2$): 20000 h$^{-1}$, LHSV (ester): 1.4 h$^{-1}$, is shown.

The results in respect of the particle size $D_{90}$ are shown in graph form in FIGS. 3 and 4. It can be seen that the activity (ester conversion) increases with decreasing $D_{90}$ values. A similar behavior can be observed in respect of the $D_{50}$ and $D_{10}$ values. A particularly high activity can be observed for the catalysts 7 and 8. The activity goes through a maximum in this range of the catalyst compositions and the graphites used.

The values for the activity and the selectivity obtained by the above-described method are shown in table 5 for the catalysts 7 and 10 to 14. These catalysts differ only in the amounts of graphite which are mixed in. The activity is once again reported as percentage conversion of the ester and the selectivity is reported as percentage value in respect of the formation of paraffins as undesirable by-product.

TABLE 5

FAME conversion and formation of
the by-product paraffin at 180° C.

|  | Graphite | Proportion [% by weight] | FAME conversion at 180° C. [%] | Selectivity to paraffin at 180° C. [%] |
|---|---|---|---|---|
| Catalyst 10 | #7 | 1 | 77.1 | 0.039 |
| Catalyst 7 | #7 | 2 | 82.3 | 0.026 |
| Catalyst 11 | #7 | 4 | 85.2 | 0.022 |
| Catalyst 12 | #7 | 8 | 88.1 | 0.02 |
| Catalyst 13 | #7 | 12 | 85.9 | 0.019 |
| Catalyst 14 | #7 | 16 | 84 | 0.023 |

Figure 5:
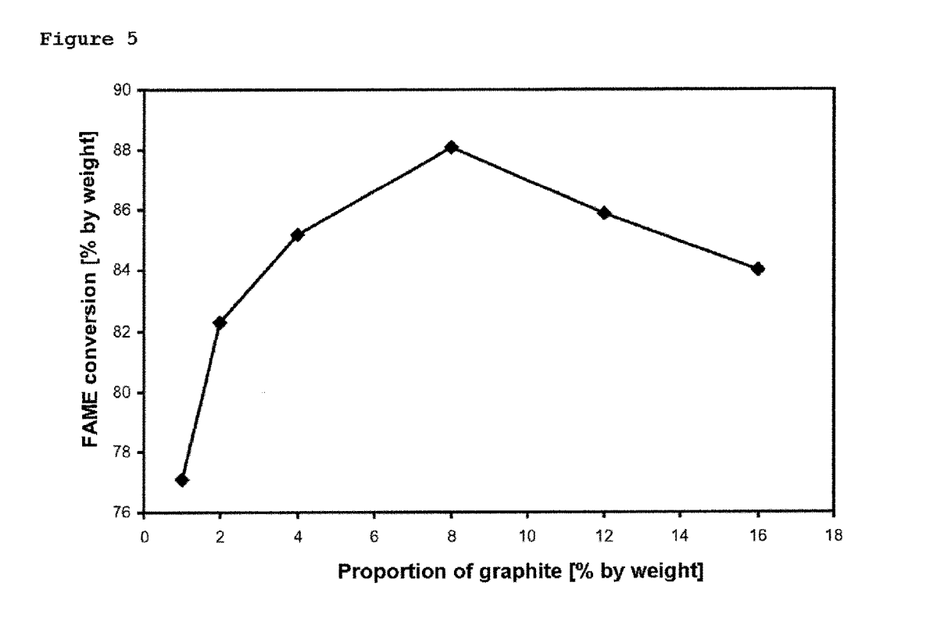
FIG. 5 shows the catalytic properties of various shaped catalyst bodies according to the invention as a function of the amount of graphite for the example of graphite #7. The conversion of fatty acid methyl ester in percent by weight under the following conditions: temperature: 180° C., pressure: 280 bar, GHSV ($H_2$): 20000 h$^{-1}$, LHSV (ester): 1.4 h$^{-1}$, is shown.
Figure 6:
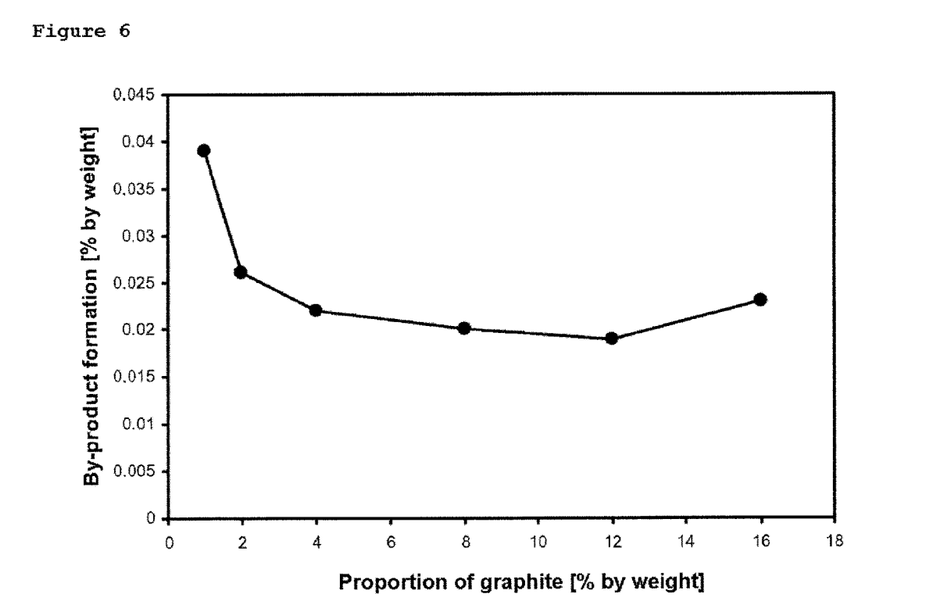
FIG. 6 shows the catalytic properties of various shaped catalyst bodies according to the invention as a function of the amount of graphite for the example of graphite #7. The formation of the by-product paraffin in percent by weight under the following conditions: temperature: 180° C., pressure: 280 bar, GHSV ($H_2$): 20000 h$^{-1}$, LHSV (ester): 1.4 h$^{-1}$, is shown.

The results as a function of the amount of graphite used are shown in graph form in FIGS. 5 and 6. It can be seen that the activity and selectivity can be increased by increasing the amount of graphite. The activity of the catalysts is greatest at a proportion of about 8% by weight of graphite. The selectivity behaves analogously. The least by-product (paraffins) is formed in a range from 8 to 12% by weight of graphite.

The invention claimed is:

1. A shaped catalyst body obtained by a process comprising the steps of:
    (a) Mixing of a metal oxide with graphite, and
    (b) Shaping the mixture to give a shaped body, where the particle diameter $D_{90}$ of the graphite is:
        5.0 µm ≤ $D_{90}$ ≤ 17.5 µm
    wherein the shaped catalyst body comprises a metal and/or a metal oxide, where the metal is selected from the group consisting of Cu, Zn, Al, Mn, Cr, Ni and mixtures thereof, the metal oxide is selected from the group consisting of copper oxide, zinc oxide, aluminum oxide, manganese oxide, chromium oxide, nickel oxide and mixtures thereof and the particle diameter $D_{90}$ of the graphite in the shaped catalyst body is 5.0 µm ≤ $D_{90}$ ≤ 17.5 µm.

2. A shaped catalyst body as claimed in claim 1, wherein the metal is selected from the group consisting of Cu, Zn, Al, Mn and mixtures thereof and the metal oxide is selected from the group consisting of copper oxide, zinc oxide, aluminum oxide, manganese oxide and mixtures thereof.

3. A shaped catalyst body as claimed in claim 1, wherein the amount of graphite in the shaped catalyst body is of from 0.1 to 20% by weight, preferably from 1 to 14% by weight, in particular from 2.0 to 12.0% by weight, particularly preferably from 4.0 to 10.0% by weight, calculated as amount of pure carbon and based on the total weight of the shaped catalyst body.

4. A shaped catalyst obtained by a process, comprising the steps of:
    (a) Mixing of a metal oxide with graphite, and
    (b) Shaping the mixture to give a shaped body, wherein the particle diameter $D_{90}$ of the graphite is:
        5.0 µm ≤ $D_{90}$ ≤ 17.5 µm,
    wherein 95% by weight or more of the weight of graphite remains in the shaped catalyst body obtained after step (b) and wherein the shaped catalyst body comprises a metal and/or a metal oxide, where the metal is selected from the group consisting of Cu, Zn, Al, Mn, Cr, Ni and mixtures thereof, the metal oxide is selected from the group consisting of copper oxide, zinc oxide, aluminum oxide, manganese oxide, chromium oxide, nickel oxide and mixtures thereof and the particle diameter $D_{90}$ of the graphite in the shaped catalyst body is 5.0 µm ≤ $D_{90}$ ≤ 17.5 µm.

5. A shaped catalyst body as claimed in claim 4, wherein the metal is selected from the group consisting of Cu, Zn, Al, Mn and mixtures thereof and the metal oxide is selected from the group consisting of copper oxide, zinc oxide, aluminum oxide, manganese oxide and mixtures thereof.

6. A shaped catalyst body as claimed in claim 4, wherein the amount of graphite in the shaped catalyst body is of from 0.1 to 20% by weight, preferably from 1 to 14% by weight, in particular from 2.0 to 12.0% by weight, particularly preferably from 4.0 to 10.0% by weight, calculated as amount of pure carbon and based on the total weight of the shaped catalyst body.

* * * * *